United States Patent [19]
Förster

[11] Patent Number: 5,937,975
[45] Date of Patent: Aug. 17, 1999

[54] VIBRATION DAMPER FOR A MOTOR VEHICLE AND A VIBRATION DAMPER HAVING A DAMPING VALVE WITH ADJUSTABLE DAMPING FORCE FOR A MOTOR VEHICLE

[75] Inventor: Andreas Förster, Schweinfurt, Germany

[73] Assignee: Fichtel & Sachs AG, 97419 Schweinfurt, Germany

[21] Appl. No.: 08/878,838

[22] Filed: Jun. 20, 1997

[30]       Foreign Application Priority Data

Jun. 21, 1996 [DE] Germany ........................ 196 24 896
May 28, 1997 [DE] Germany ........................ 197 22 216

[51] Int. Cl.⁶ .................... F16F 9/46; B60G 17/08
[52] U.S. Cl. .................... 188/266.6; 188/322.13
[58] Field of Search ................ 188/266.6, 322.13, 188/266.8, 266.2, 322.2, 322.19, 267, 282.2, 318, 299.1, 282.3, 282.4, 266.5, 297; 701/37–40; 280/5.515; 267/140.14, 140.15, 64.15

[56]           References Cited

U.S. PATENT DOCUMENTS

| | | | |
|---|---|---|---|
| 4,785,920 | 11/1988 | Knecht et al. | 188/299 |
| 4,850,460 | 7/1989 | Knecht et al. | 188/322.13 |
| 5,265,703 | 11/1993 | Ackermann | 188/266.6 |
| 5,398,787 | 3/1995 | Woessner et al. | 188/266.6 |
| 5,413,196 | 5/1995 | Förster | 188/266.6 |
| 5,551,540 | 9/1996 | Förster et al. | 188/299 |
| 5,632,361 | 5/1997 | Wulff et al. | 188/267 |
| 5,651,433 | 7/1997 | Wirth et al. | 188/266.6 |

FOREIGN PATENT DOCUMENTS

| | | |
|---|---|---|
| 3800288 | 6/1989 | Germany. |
| 4023828 | 1/1992 | Germany. |
| 4026531 | 2/1992 | Germany. |
| 4114305 | 6/1992 | Germany. |
| 4104110 | 8/1992 | Germany. |

*Primary Examiner*—Douglas C. Butler
*Attorney, Agent, or Firm*—Nils H. Ljungman & Associates

[57]              ABSTRACT

A vibration damper has a cylinder filled with damping medium. In the cylinder, a piston rod with a piston is realized so that the piston can move axially. The piston divides the cylinder into two working chambers. The vibration damper also has a damping valve. The damping force of the damping valve can be changed by a magnetic force generated by a magnetic coil inside a magnetic return body on an armature against a spring force of at least one spring. At least two regulating or adjustment parameters are provided to set at least two characteristics which differ from one another in terms of different flows to the magnetic coil. The characteristics can be set by a change of the effective spring characteristic with reference to a damping valve stroke position of the damping valve and also by the ability to regulate the magnetic conductivity of the magnetic return body by an actuator. The actuator can have a magnetic constriction, to which constriction a magnetic conductor body can be connected in parallel.

20 Claims, 10 Drawing Sheets

VIBRATION DAMPER FOR A MOTOR VEHICLE AND A VIBRATION DAMPER HAVING A DAMPING VALVE WITH ADJUSTABLE DAMPING FORCE FOR A MOTOR VEHICLE

BACKGROUND OF THE INVENTION

1. Field of the Invention

The present invention relates generally to a vibration damper with an adjustable damping force. The vibration damper includes a cylinder filled with a damping medium. In the cylinder, a piston rod with a piston is realized so that the piston can move axially. The piston divides the cylinder into two working chambers. The vibration damper also has a damping valve. The damping force of the damping valve can be changed by a magnetic force generated by a magnetic coil inside a magnetic return body acting on an armature against a spring force of at least one spring.

2. Background Information

German Patent No. 41 14 305 A1 describes a known vibration damper in which the damping force characteristic is determined essentially by the tuning of a spring which acts on a shutoff valve body. The dimensions of the pressurized surfaces also have an essential influence on the opening action of the damping valve.

One characteristic of this known valve is that it has damping force characteristics which are relatively flat and which run essentially parallel to one another in the range of higher flow velocities of the damping medium. In this context, reference is made to German Patent No. 41 04 110 A1, FIG. 13. A major problem with these known valves is that they are relatively sensitive to tolerances, which means that significant time, effort and expense must be devoted to their regulation and adjustment. Recently, it has become possible to adjust the biases of one or more springs of the damping valve, as a result of which the characteristics can be shifted, within limits.

German Patent No. 38 00 288 C1 describes a valve arrangement for a hydraulic adjustable vibration damper in which a correct magnetic flux can be established by means of a clamping screw or tension screw. This design is based on an air gap in the path provided for the magnetic flux. The air gap represents a resistance, the action of which reduces the effect of the force of the magnetic coil. If the air gap can be neutralized, overcome or bridged, the magnetic force provided becomes available.

German Patent No. 40 23 828 A1 describes a method for regulating, setting or tuning a valve in which a valve assumes a switching function in the opening direction for a valve body.

The valve is designed, within a defined opening phase, to allow a specified quantity to flow through. A parameter for the achievable flow amount is that the opening movement must take place as quickly as possible. For that purpose, a minimum magnetic force is necessary to lift the valve body against the force of a spring. If the required minimum force is not achieved, only the resistance to the magnetic flux is set.

OBJECT OF THE INVENTION

The object of the present invention is to create the ability to adjust, set or calibrate the operating characteristics of a vibration damper with an adjustable damping force.

SUMMARY OF THE INVENTION

The present invention teaches that this object can be accomplished by providing a vibration damper with a cylinder filled with a damping medium. In the cylinder, a piston rod with a piston is realized so that the piston can move axially. The piston divides the cylinder into two working chambers. The vibration damper also has a damping valve. The damping force of the damping valve can be changed by a magnetic force generated by a magnetic coil inside a magnetic return body acting on an armature against a spring force of at least one spring.

At least two regulating, setting, tuning or adjustment parameters are provided to set at least two characteristics, which characteristics differ from one another in terms of different flows to the magnetic coil. A change of the effective spring characteristic with reference to a damping valve stroke position of the damping valve can be made to set a characteristic and as a result of the ability to regulate the magnetic conductivity of the magnetic return body by means of an actuator a characteristic can also be set. The actuator device can include a magnetic constriction, bottleneck or defile, to which a magnetic conductor body can be connected in parallel.

As a result of this advantageous measure, the damping force characteristic field can be set with great accuracy. In particular, tolerances of the magnetic conductivity of the magnetic return body can easily be neutralized. Effectively, an operating point in a damping force-velocity characteristic field can be displaced horizontally and vertically until an overall characteristic field is achieved which corresponds to the specified requirements. The time and effort required to realize the present invention are within reasonable limits, and are in a very favorable ratio to the achievable result.

As disclosed in an advantageous embodiment, the present invention shows that the actuator device for the magnetic flux can be set independently of a spring assist device. The spring assist device is designed to change the bias of the spring. It thereby becomes possible to maintain a strict separation between the displacement directions of a measurement point in the characteristic field.

In an additional advantageous embodiment, the conducting body has an essentially ring-shaped configuration. As a result of the ring-shaped configuration of the conducting body there is access to the rearward chamber of the armature. Consequently, the spring assist device can be set from the same side outside the housing.

The present invention also shows that in a particularly space-saving embodiment, the spring assist device is oriented concentric to the actuator device for the magnetic flux.

The present invention also shows in one embodiment that the damping valve has one valve part for an emergency operation setting and one valve part for normal operation. The spring force applies a bias in the opening direction to the valve part for normal operation. The emergency operation setting corresponds approximately to an intermediate damping force setting, but not to either the maximum hard or soft damping force setting. Valves of this type have the advantage that they can be held in the softer damping force setting, which occurs frequently during operation, with a relatively small current consumption.

As indicated in a possible embodiment, the conductor body is actuated by means of a thread. Thus, a continuous calibration or adjustment of the magnetic force which acts on the armature is possible. In this context, the conductor body has tool surfaces for an adjustment tool. Even if the shutoff valve device is already closed, the calibration can still be performed, because the conductor body is located outside a shutoff valve housing. The shutoff valve housing is a component of the magnetic return body.

In another possible embodiment of the present invention, the magnetic flux generated by the magnetic coil or solenoid can force the armature to move in a downward direction toward a main stage valve. A possible path the magnetic flux can travel is described as follows. First, the magnetic flux can pass in a counter-clockwise direction from the solenoid to a cover, through a magnetic constriction and down a sleeve segment. Next, the magnetic flux can be directed to a ring-shaped body of the armature by an insulator. The insulator is preferably positioned to deflect the magnetic flux toward the ring-shaped body and to prevent a jump or short circuit of the magnetic flux from the sleeve segment to a receptacle or locator body. The application of magnetic flux to the ring-shaped body can cause the ring shaped body and armature to move in the direction of the magnetic flux. Finally, the magnetic flux can pass from the ring-shaped body to the receptacle body and back to the solenoid.

The conductor body and an additional component are also located axially one behind the other in a bypass for the magnetic flux, whereby the bypass for the magnetic flux can be controlled by changing the distance between the conductor body and the additional component.

In another possible embodiment of the present invention the conductor body can be located axially behind a set screw to form a bypass for the magnetic flux around the magnetic constriction. The distance between the conductor body and the set screw can be used to control the amount of magnetic flux that passes through the bypass around the magnetic constriction. The conductor body can be displaced to adjust the distance between the conductor body and the set screw to therefore adjust the amount of magnetic flux that passes through the bypass. The amount of magnetic flux that passes through the bypass can be used to change the magnetic force applied to the ring-shaped body and thus to change the damping force characteristics of the damping valve.

The present invention shows in one embodiment that it is advantageous if the conductor body has an adjustment retaining device or lock. Vibrations experienced when the vehicle is in operation, as well as vibrations during installation, should not cause any changes in the settings of the damping valve, once it has been calibrated. Therefore the spring assist device also has a regulation or setting retaining device or lock.

For example, the regulation retaining device is located between a component, which component is effectively connected to the housing, and the spring assist device. The housing is the largest and most robust component, and can therefore be used as the basis for the retaining devices.

Extensive tests have shown that it can be particularly advantageous if the adjustment retaining device and/or the regulation retaining device are actuated non-positively. Form-fitting or positive connections have a tendency to result in minor changes to the settings of the valve. For that purpose, the regulation retaining device and/or the adjustment retaining device can include a friction ring. The friction ring is a particularly advantageous component because it takes up very little space.

The above discussed embodiments of the present invention will be described further hereinbelow with reference to the accompanying figures. When the word "invention" is used in this specification, the word "invention" includes "inventions", that is, the plural of "invention". By stating invention, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, wherein.

DESCRIPTION OF THE PREFERRED EMBODIMENT

Figure 1:
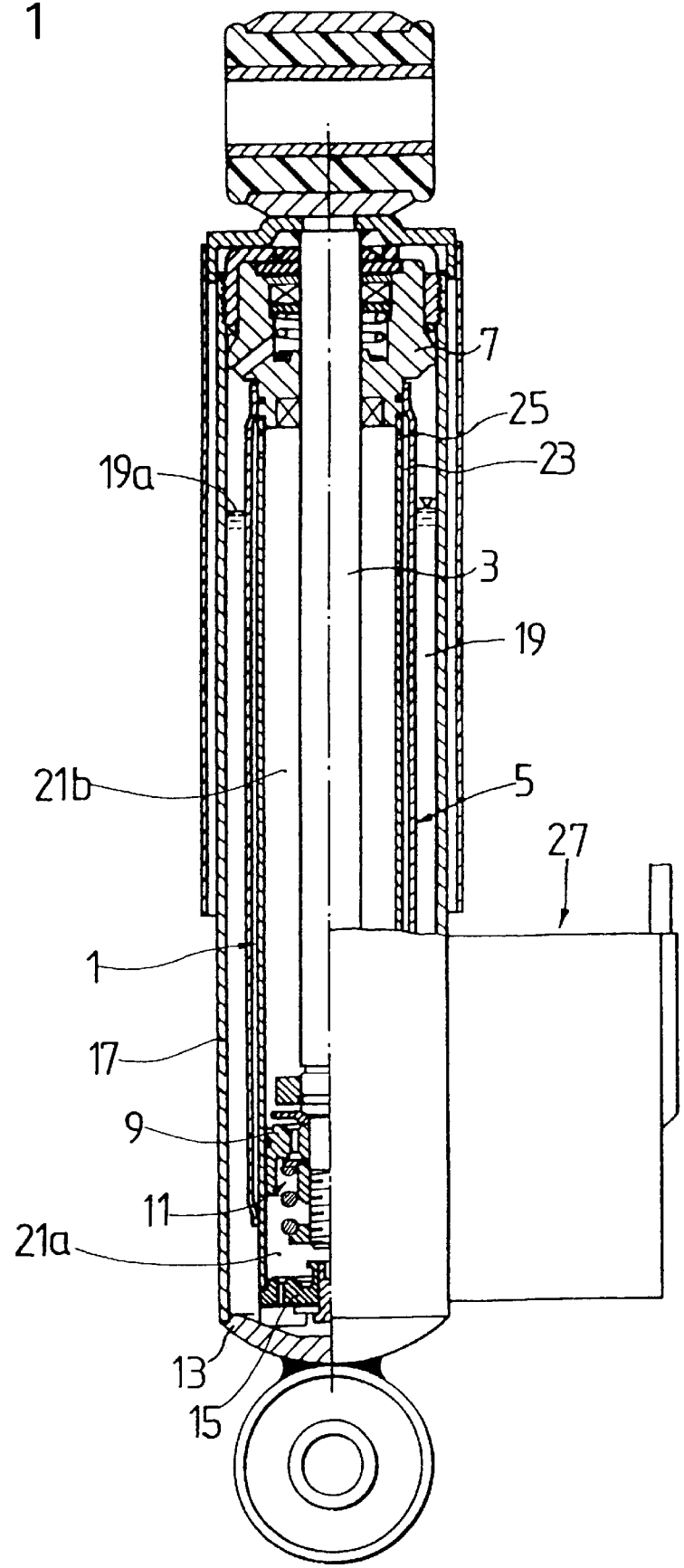
FIG. 1 shows an overall view of a vibration damper.

FIG. 1 shows a vibration damper having a cylinder 1 in which cylinder 1 a piston rod 3 can be located so that the piston rod 3 can move axially. A guide and sealing unit 7 can guide the piston rod 3 out of the upper end of the cylinder 1. Inside the cylinder 1, a piston unit 9, which piston unit 9 can have a piston valve system 11, is preferably fastened to the piston rod 3. The lower end of the cylinder 1 can be closed by a base plate 13. The base plate 13 can have a base valve system 15. The cylinder 1 is preferably surrounded by an outer or reservoir tube 17. The outer tube 17 and an intermediate tube 5 can form or define an annular space 19 between them. The annular space 19 can represent a reservoir. The space inside the cylinder 1 can be divided by the piston unit 9 into a first working chamber 21a and a second working chamber 21b. The working chambers 21a and 21b are preferably filled with hydraulic fluid. The annular space or reservoir 19 can be filled up to a level 19a with hydraulic fluid and above that with gas. Inside the reservoir 19 there may be a first line segment, namely a high pressure segment 23. The high pressure segment 23 may be in communication by means of a boring 25 in the cylinder 1 with the second working chamber 21b. Connected to the high pressure segment 23 can be a shutoff valve device 27. The shutoff valve device 27 can be attached to the side of the outer tube 17. From the shutoff valve device 27, a second line segment, namely a low pressure segment (not shown) can lead into the reservoir 19.

In other words and in accordance with another possible embodiment, the high pressure segment, high pressure line or high pressure connection 23 can be located between the cylinder 1 and the intermediate tube 5. A boring, hole or passageway 25 in the cylinder 1 can provide a passageway for the damping or hydraulic fluid to flow between the second or upper working chamber 21b and the high pressure line 23. The high pressure line 23 is preferably connected to the shutoff valve device 27. The low pressure segment, low pressure line or low pressure connection can connect the shutoff valve device 27 to the reservoir or equalization chamber 19.

As the piston rod 3 is extended upward and out of the cylinder 1, the upper working chamber 21b can become smaller. An overpressure builds up in the upper working chamber 21b, which overpressure can only be dissipated into the first or lower working chamber 21a by means of the piston valve system 11 as long as the shutoff valve device 27 is or remains closed. If the shutoff valve device 27 is opened, fluid can flow simultaneously from the upper working chamber 21b through the high pressure segment 23 and through the shutoff valve device 27 into the equalization chamber 19. The damping characteristic of the vibration damper when the piston rod 3 is extended out of the cylinder 1 can therefore be a function of whether the shutoff valve device 27 is more or less open or closed. The shutoff valve device 27 can therefore be adjusted either continuously or in discrete stages.

As the piston rod 3 is retracted or inserted into the cylinder 1, an overpressure can build up in the lower working chamber 21a. Fluid can flow from the lower working chamber 21a through the piston valve system 11 upward into the upper working chamber 21b. The fluid displaced by the increasing volume of the piston rod 3 inside the cylinder 1 may be expelled through the base valve system 15 into the equalization chamber 19. Because the flow resistance of the piston valve system 11 is lower than the flow resistance of the base valve system 15, an increasing pressure can also occur in the upper working chamber 21b. While the shutoff valve device 27 is open, the increasing pressure can overflow through the high pressure segment 23 back into the reservoir 19. As a result, when the shutoff valve device 27 is open, the shock absorber has a softer characteristic even when the piston rod 3 is being retracted and a harder characteristic when the shutoff valve device 27 is closed, just as when the piston rod 3 is being extended. It should be noted that the flow direction through the high pressure segment 23 of the bypass can always be the same, regardless of whether the piston rod 3 is being extended or retracted.

In another possible embodiment of the present invention, the shock absorber can have a softer characteristic when the shutoff valve device 27 is open and a harder characteristic when the shutoff valve device 27 is closed. The shock absorber can have the above characteristics regardless of whether the piston rod 3 is being inserted into or extended from the cylinder 1.

Figure 2:
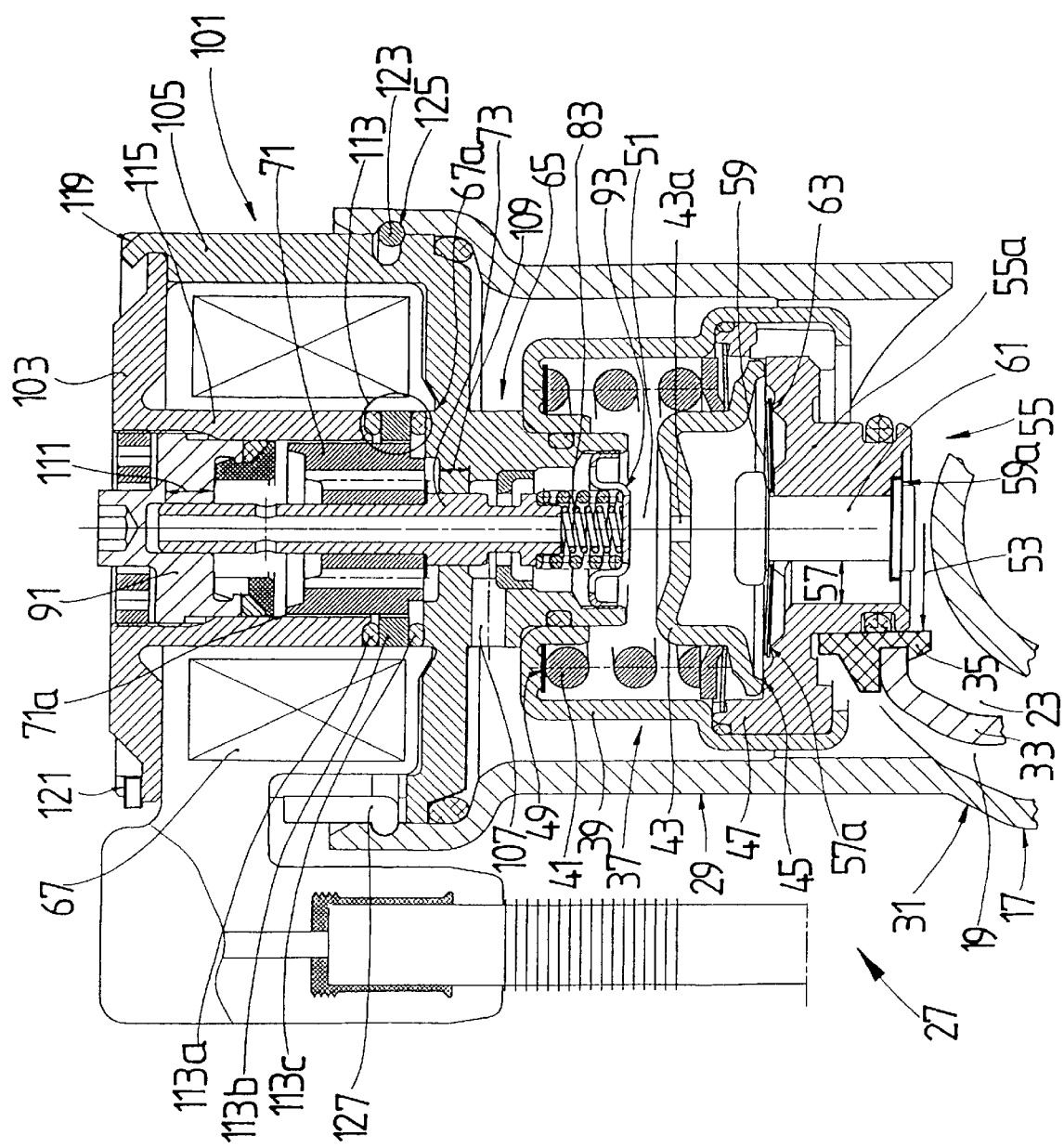
FIG. 2 shows a cross section through a shutoff valve device.

FIG. 2 is limited to an illustration of the shutoff valve device 27. The shutoff valve device 27 can be connected by a pipe socket 29 with a connecting socket 31 of the outer tube 17. The high pressure segment 23 can be formed by the intermediate tube 5 (see FIG. 1). The intermediate tube 5 can have a connecting opening 33 to the shutoff valve device 27. The connecting opening 33 of the intermediate tube 5 can have a snapped-in intermediate ring 35. The intermediate ring 35 can form a connection to a main or main stage valve 37.

The main valve 37, inside a main valve housing 39, preferably has a spring 41. The spring 41 can bias a shutoff valve body 43 against a shutoff valve seat 45. The shutoff valve seat 45 may be a component of a disc body or valve gate body 47. The disc body 47 can limit the main stage valve housing 39 on an end. The spring 41 can be supported on a rear wall 49 of the main valve housing 39. The rear wall 49, the main valve housing 39 and the disc body 47 may form a control chamber 51. The pressurized surfaces on the main stage valve 37 can be designed on the basis of the principle that the valve-opening surfaces must be larger than the valve-closing surfaces. Consequently, when the flow into the main valve 37 is via a central channel 53 inside the intermediate tube 5, a downward movement of the shutoff valve body 43 can always be realized if the spring force of the spring 41 is overcome. The main stage valve housing 39 can represent an independent assembly unit which can be subjected to an independent inspection and testing.

In another possible embodiment of the present invention, the pressure of the damping fluid in the control chamber 51 and the spring force of the spring 41 can be used to hold the ends of the shutoff valve body 43 against the shutoff valve seat 45. However, the ends of the shutoff valve body 43 can be lifted off the shutoff valve seat 45 by a damping fluid overcoming the bias of the spring 41 and the pressure of damping fluid in the control chamber 51. When the ends of the shutoff valve body 43 are lifted off the shutoff valve seat 45, damping fluid can be bypassed into the equalization chamber 19.

There is preferably an inlet valve 55 in the central channel 53. The inlet valve 55 can include an inlet cross section 57. The inlet cross section 57 can be covered by at least one valve disc 59. In FIG. 2, the plane of the cross section has been placed through one inlet cross section 57 and one web 55a of the inlet valve 55. A plurality of inlet cross sections 57 can be used, which inlet cross sections 57 are preferably separated by the webs 55a in the inlet valve 55. In the compression direction and in the rebound direction, for a velocity range of the damping medium in which the main valve 37 and/or a pilot valve 65 can be open, the inlet valve 55 can generate a damping force. Overall, the damping force characteristic in this velocity range tends to rise to a greater damping force, without having to make major modifications on the piston valve 11 and on the base valve 15, because as described above, the shutoff valve device 27 is acting for both directions of movement of the piston rod 3.

Figure 2A:
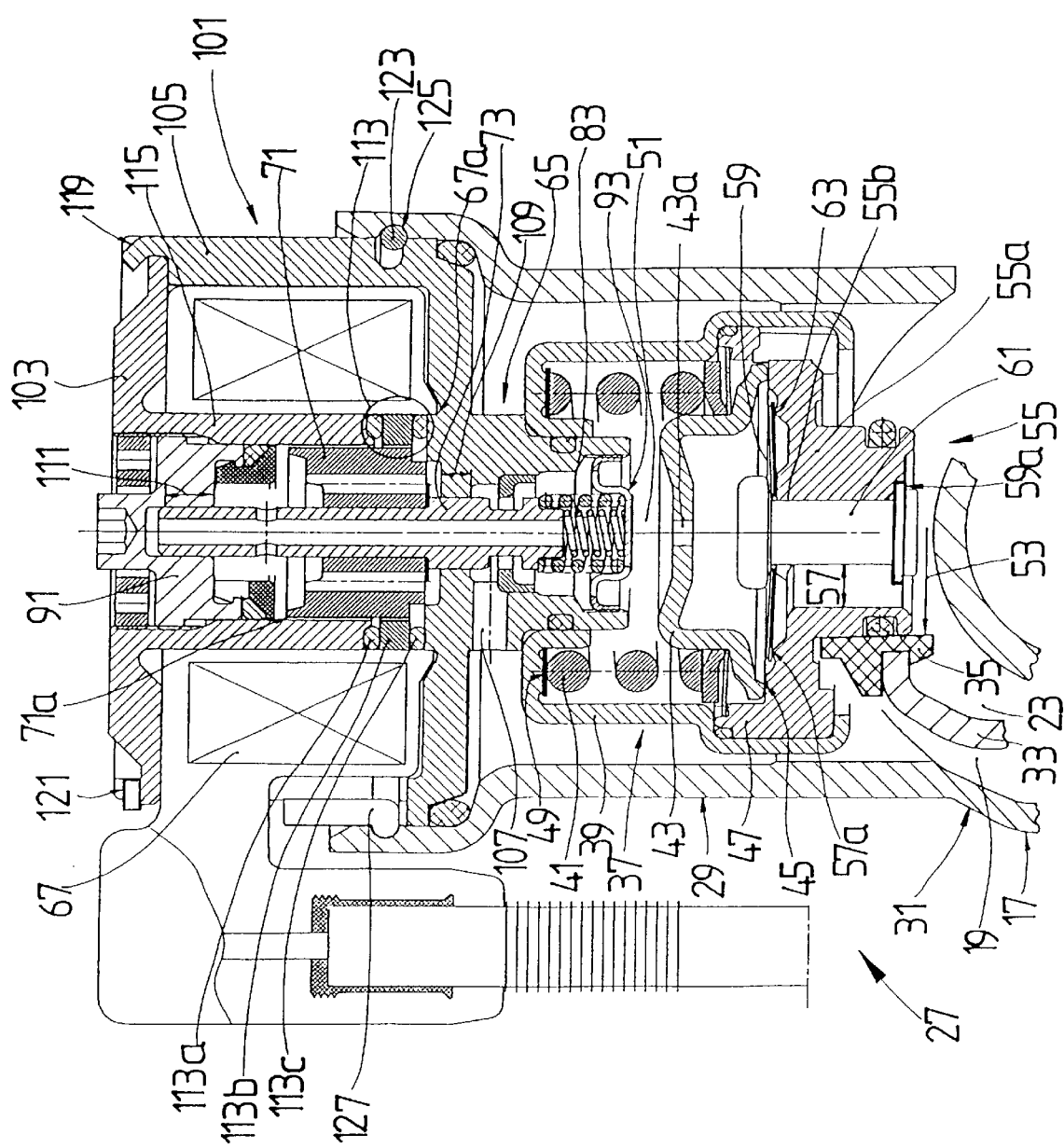
FIG. 2A shows additional features of the shutoff valve of FIG. 2.

The at least one valve disc 59 can be held on the inlet valve 55 by a rivet 61. For that purpose, the webs 55a can form an opening 55b (see FIG. 2A). The webs 55a, in the vicinity of the opening 55b, do not preferably have any connection in the peripheral direction. In practical terms, the end surfaces of the webs 55a center the rivet 61. In this embodiment, instead of a rivet 61, a screw can also be used. By changing the conical deformation of the at least one valve disc 59, the damping force characteristic of the inlet valve 55 can be adjusted to meet the requirements at hand. A pilot cross section 57a of a pilot throttle can also be realized via an additional pilot throttle disc 59a to achieve a range in which the damping force characteristic of the inlet valve 55 is progressive. For the at least one valve disc 59, a valve seat surface 63, which valve seat surface 63 is independent of the shutoff valve body 43, has also been worked into the disc bodies 47.

The control of the main stage valve 37 can be effected by the pilot valve 65. For that purpose, the damping medium can flow through an opening 43a of the shutoff valve body 43 toward the pilot valve 65. The opening 43a and the inlet cross section 57 can be at some radial distance from one another, so that the dynamic or impact pressure of the damping medium flowing out of the main stage valve 37 is not exerted in full on the pilot valve 65.

In another possible embodiment of the present invention, the opening 43a and the inlet cross section 57 can be positioned to be off-center from one another. Stated another way, the opening 43a and the inlet cross section 57 can also be arranged to be substantially non-colinear. The misalignment of the opening 43a and the inlet cross section 57 can be used to prevent the full impact of the pressure of the damping medium flowing through the inlet cross section 57 from acting upon the pilot valve 65.

Figure 3:
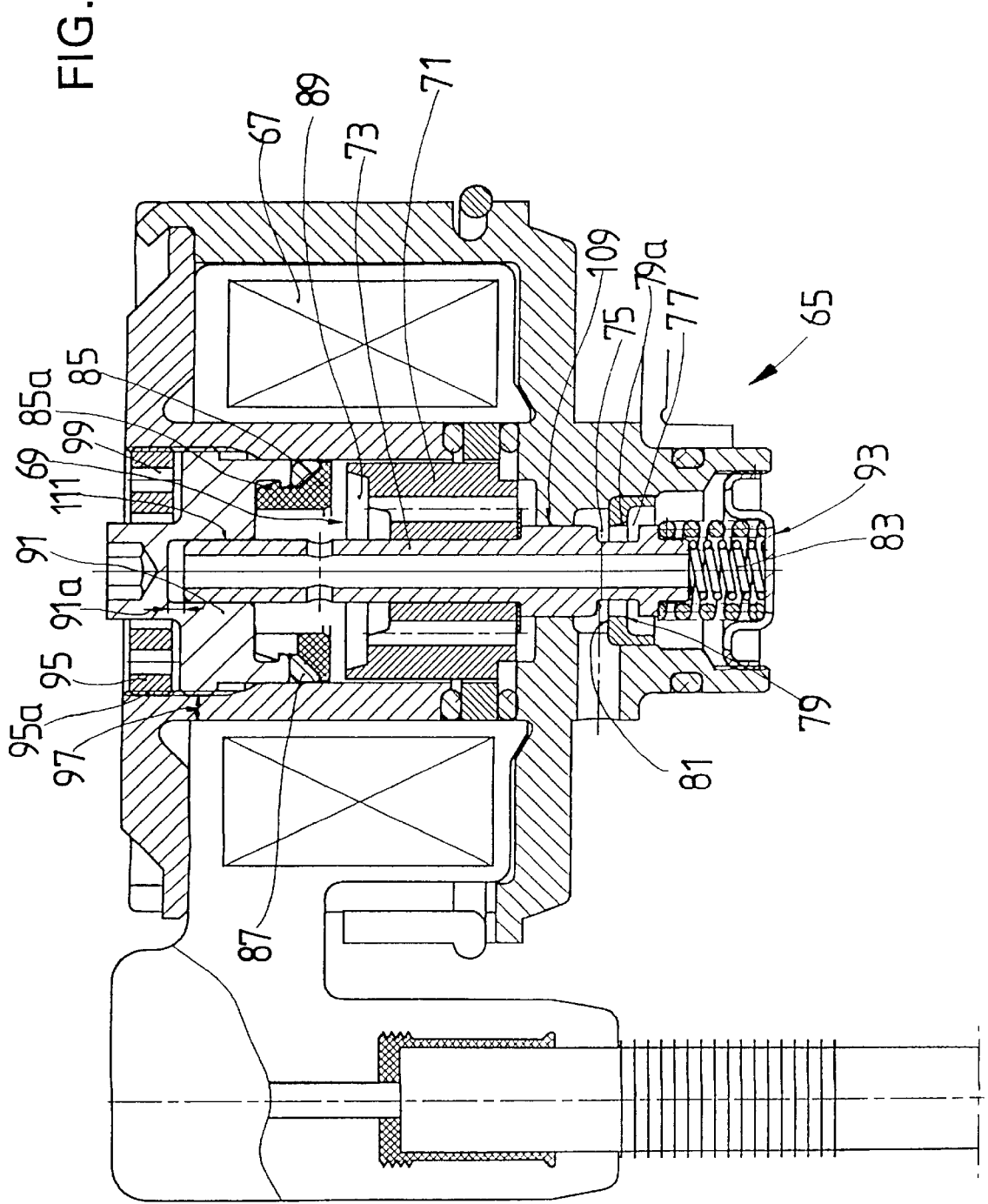
FIG. 3 shows a cross section through the pilot valve of the shutoff valve device.

The pilot valve 65 is illustrated on an enlarged scale in FIG. 3. The setting of the pilot valve 65 can be modified by an actuator in the form of a magnetic coil 67 in connection with an armature 69. The armature 69 can include a magnetically conducting or conductive ring-shaped body 71, in which ring-shaped body 71 a non-magnetizable axle, axis or axial body 73 is located. The axle body 73 can be realized in the form of a tube, so that the hydraulic pressure on the armature 69 can be considered to be essentially equalized. The pilot valve 65 can be realized on the end of the axle body 73 facing the main stage valve 37. The pilot valve 65 preferably has one valve part 75 for normal operation and one valve part 77 for emergency operation of the shutoff valve device 27. The normal operation valve part 75 can optionally be realized in the form of a seat or gate valve. The emergency operation valve part 77 can be realized in the form of a gate valve and can interact with a control edge 79. The control edge 79 lies opposite a valve seat 81 for the normal operation valve part 75. Consequently, as the passage cross section of the emergency operation valve part 77 decreases, the passage cross section of the normal operation valve part 75 should increase by the same amount.

A minimum passage cross section for emergency operation can be defined by a notch 79a in the control edge 79 or in the emergency operation valve part 77. It must be recalled that above a certain size of the passage cross section for the normal operation valve part 75, no further change in the pilot action can occur. This size is preferably determined by the stroke travel. Consequently, the action of the two valve parts 75, 77 can be configured independently via their stroke travel. For that purpose, it is possible to use a spring set 83, which spring set 83, in one embodiment, can be realized in two parts. It can also be possible to use a one-piece spring, if this spring has a non-linear spring constant, i.e. if the spring constant increases with increasing spring travel.

In another possible embodiment of the present invention, the stroke travel or distance can equal the distance travelled by the valve parts 75, 77 between two extreme positions. The stroke travel may be approximately equal to the distance between the normal operation valve part 75 and the emergency operation valve part 77 on the axle or shaft body 73.

In the embodiment of FIG. 3, the above mentioned non-linear spring constant has been realized in the form of two springs, which springs have significantly different individual spring constants. A longer spring with a small spring constant is always in contact against the axle body 73, and applies a bias to the axle body 73 against the magnetic force or, in emergency operation, against a stop 85. The shorter spring acts only if the armature 69 is in normal operation. Otherwise, there is no contact between the axle body 73 and the shorter spring.

In other words, the shorter spring can be in contact with the axle or shaft body 73 during normal operation. However, in emergency operation, the shorter spring preferably does not contact the shaft body 73 because the longer spring has preferably pushed the shaft body 73 away from the shorter spring and against the stop 85.

The stop 85, by its position, can define the passage cross section in emergency operation, because the ring-shaped body 71 is supported with its back side on the stop 85. The stop 85 may preferably be made of a non-conducting material with a relative permeability equaling approximately 1, so that no losses of the magnetic flux can occur and that the armature 69 does not preferably stick to the stop 85. Behind the stop 85 there is a stop gasket 87, which stop gasket 87 seals an armature reaction chamber or rear chamber 89 from the environment. The stop 85 is also preferably made of an elastic material.

Behind the stop 85, a set screw 91 can be attached. The set screw 91 can be axially adjusted by means of a thread together with the stop 85 in relation to the ring-shaped body 71. By means of the set screw 91, the passage cross section for emergency operation can be continuously adjusted on a fully assembled and installed shutoff valve device 27 without thereby having a significant effect on the normal operation valve part 75, because the valve parts 75, 77 can be separated by means of the stroke plus the spring set or separate springs 83. For that purpose, there can be an axial distance 91a between the set screw 91 and the end of the armature 69 facing the set screw 91. A connection may be created between the set screw 91 and the stop 85 via snap hooks 85a. The connection can apply a bias to the stop gasket 87. Alternatively, a threaded or press-fitted connection can also be used.

To adjust the normal operation valve part 75, there is a spring assist device. The spring assist device can be realized in the form of a spring assist plate 93. The axial position of spring assist plate 93 can also be adjusted by means of a thread, whereby the spring bias of the spring set 83 can be adjusted to meet specific requirements. Because the spring set or springs 83 are opposite the normal operation valve part 75, the spring force in the opening direction can act with regard to or on the normal operation valve part 75. Of course, the spring for the emergency operation valve part 77 is also changed, but as noted several times above, on account of the low spring constant, any such change has practically no effect on the valve action of the emergency operation valve part 77.

As an additional way for the adjustment of the pilot valve 65 there can be an adjustment device. The adjustment device can be realized in the form of a magnetic conductor body 95. The conductor body 95 is preferably ring-shaped, and consequently allows access to the reaction chamber or reaction space 89 of the armature 69. The conductor body 95 can be located in a bypass parallel to a magnetic constriction 97. The conductor body 95 and the set screw 91 are preferably located axially one behind the other in the bypass. As the conductor body 95 is displaced toward the set screw 91 by means of a thread 95a, the distance between the set screw 91 and the conductor body 95 is reduced to the same degree. Consequently, the magnetic constriction 97 is less effective, because the distance, which distance represents a resistance for the magnetic flux, decreases and the magnetic flux travels via the bypass. As a result of this measure, the magnetic flux with its force effect on the ring-shaped body 71 can be adjusted against the force of the spring set 83 in a controlled manner, to compensate for manufacturing tolerances which might influence the force on the armature 69.

In another possible embodiment of the present invention, the conductor body 95 can be located axially behind the set screw 91. A gap can exist between the conductor body 95 and the set screw 91. The gap can be used to limit the path of the magnetic flux to just the magnetic constriction 97 because the gap can prevent magnetic flux from passing through the bypass. However, as the conductor body 95 is moved towards the set screw 91, the gap between the conductor body 95 and the set screw 91 is preferably reduced and magnetic flux can pass through the bypass around the magnetic constriction 97. Once the bypass around the magnetic constriction 97 is formed the effectiveness of the magnetic constriction 97 is significantly reduced because the magnetic flux can pass through the bypass and act upon the ring-shaped body 71.

To improve the adjustment capability, the conductor body 95 can have tool surfaces 99, into which tool surfaces 99 an adjustment tool can be introduced. Thus, the overall shutoff valve device 27 can have three independent adjustment means which can influence the operating behavior of the pilot valve 65 and thus the shutoff valve device 27. The action of the magnetic flux and the adjustment of the set screw 91 for the emergency operating adjustment, as well as the spring assist or support plate 93, can be operationally adjusted independently of one another.

As shown in FIG. 2, the entire shutoff valve device 27 can be located inside a housing 101. The housing 101 can have a cover 103 and a cup-shaped locator or holder 105. The housing 101 can thereby form a part of the magnetic return body for the magnetic flux. The force of the magnetic flux can be used to adjust the armature 69. The locator 105 can also represent the threaded connection for the spring assist plate 93 and a first bearing 109 for the axle body 73. The set screw 91 can be screwed into the cover 103. The cover 103 can include a second bearing 111. The two bearings 109, 111 lie far from one another in relation to the total size of the pilot valve 65, so that the centering function of the two bearings 109, 111 can be considered particularly good. The ring-shaped body 71 of the armature 69 is approximately in the center of the axle body 73. The inevitable transverse forces act approximately equally on the two bearings 109, 111. In addition, the diameters of the bearings 109, 111 are preferably rather small, so that the friction forces are kept on a particularly low level.

In another possible embodiment of the present invention, the receptacle 105 can form a part of the control chamber 51 and a discharge 107 from the control chamber 51 into the equalization chamber 19.

The forces of the magnetic flux can be directed so that they push the armature 69 downward toward the main valve 37 against the force of the spring set 83. For that purpose, on the locator 105 an optimized transition is preferably realized on the end of the ring-shaped body 71 facing the first bearing 109. In order for the action of the magnetic flux to be exerted exclusively on the armature 69, there is an insulator 113 directly on the locator 105 in the vicinity of the first bearing 109 to prevent a magnetic short circuit. The insulator 113 can be made of a non-conducting material and can thus prevent any transmission of the magnetic flux from the locator 105 to a sleeve segment 115 of the cover 103. Between the sleeve segment 115 and the ring-shaped body 71 of the armature 69 there is a rather large gap 71a, which gap 71a can limit the guidance clearly to the two bearings 109, 111. There is preferably no contact between the armature 69 and the sleeve segment 115. For the reliable transmission of the magnetic flux, however, there is preferably a relatively large peripheral surface on the ring-shaped body 71. The insulator 113 can include a first gasket 113c oriented toward the locator 105. Adjacent to the first gasket 113c can be the actual insulator 113b. The actual insulator 113b can enclose a second gasket 113a between the actual insulator 113b and the sleeve segment 115. Two gaskets 113a, 113c are preferably used, because when a single gasket is used it is possible that, on account of the bias and the related deformation of the gasket, contact may occur with the ring-shaped body 71 of the armature 69. The actual insulator 113b can have a smaller inside diameter than the ring-shaped body 71. Contact between either of the seals or gaskets 113a, 113c and the ring-shaped body 71 can thereby be prevented.

In another possible embodiment of the present invention, the two seals 113a, 113c can be used to surround the actual insulator 113b. The combined use of two seals 113a, 113c can preferably prevent one of the seals from coming into contact with the ring-shaped body 71. When a single seal is used, that seal may become deformed and may come into contact with the ring-shaped body 71. To further prevent the two seals 113a, 113c from coming into contact with the ring-shaped body 71, the actual insulator 113b can be designed to have an inside diameter smaller than the inside diameter of the seals 113a, 113c. The actual insulator 113b may also have an inside diameter smaller than the inside diameter of the sleeve segment 115. Finally, the actual insulator 113b can have an inside diameter larger than the outside diameter of the ring-shaped body 71. The magnetic coil 67 can also be adapted to the insulator 113. For that purpose, the magnetic coil 67 can have a lug-shaped extension 67a. The lug-shaped extension 67a can guarantee that under no conditions can the gasket 113c penetrate into a potential gap between the magnetic coil 67 and the locator 105, because the contact surfaces are preferably offset from one another. Changes in the length of the coil 67 or inside the clamping system including the sleeve segment 115 and the insulator 113 as a result of thermal expansion and contraction can be equalized without the formation of a gap.

The entire housing 101 of the shutoff valve device 27 can be held together by crimped edges 119 or by a circlip 121. This assembly may be supported on a shoulder of the pipe or tube socket 29. For the axial fastening of the housing 101 there can be an additional circlip 123. The circlip 123 can be engaged in a locking groove 125 of the tube socket 29, and can thereby form a snap connection. In the right-hand embodiment of the circlip in FIG. 2, disassembly is not possible. The left-hand embodiment of the circlip in FIG. 2 can have an actuator strap 127. The ends of the actuator strap 127 can be engaged in a recess in the housing 101, so that the shutoff valve device 27 can be opened at any time, if necessary.

In another possible embodiment of the present invention, the circlip 121 and the circlip 123 can be realized as a retaining ring or similar structure. Further, the end of the actuator tongue or actuator strap 127 can be used to remove the cirelip or retaining ring from the locking groove 125 without the need for assembly tools.

In the embodiment of FIG. 2, the present invention shows that the diameter of the conductor body 95 and of the set screw 91 can be slightly larger than the outside diameter of the ring-shaped body 71. It should also be noted that the diameter of the actual valve portion of the pilot valve 65 is preferably not larger than the diameter of the first bearing 109. The emergency operating valve part 77 can also be realized in the form of a gate valve. The armature 69 can thereby be removed from the shutoff valve device 27 without having to open and disassemble the entire valve. The ability to adjust the parts of the pilot valve 65 separately can be simplified by, among other things, the fact that the two clamping means which act on the armature 69 each act on different ends. The stop 85 can be set, regulated or adjusted on the end facing the magnetic coil 67, and the spring support plate 93 can be set on the end facing the main stage valve 37. The outer spring cannot fall out of the shutoff valve device 27, because the control edge 79 represents a stop.

Figure 3A:
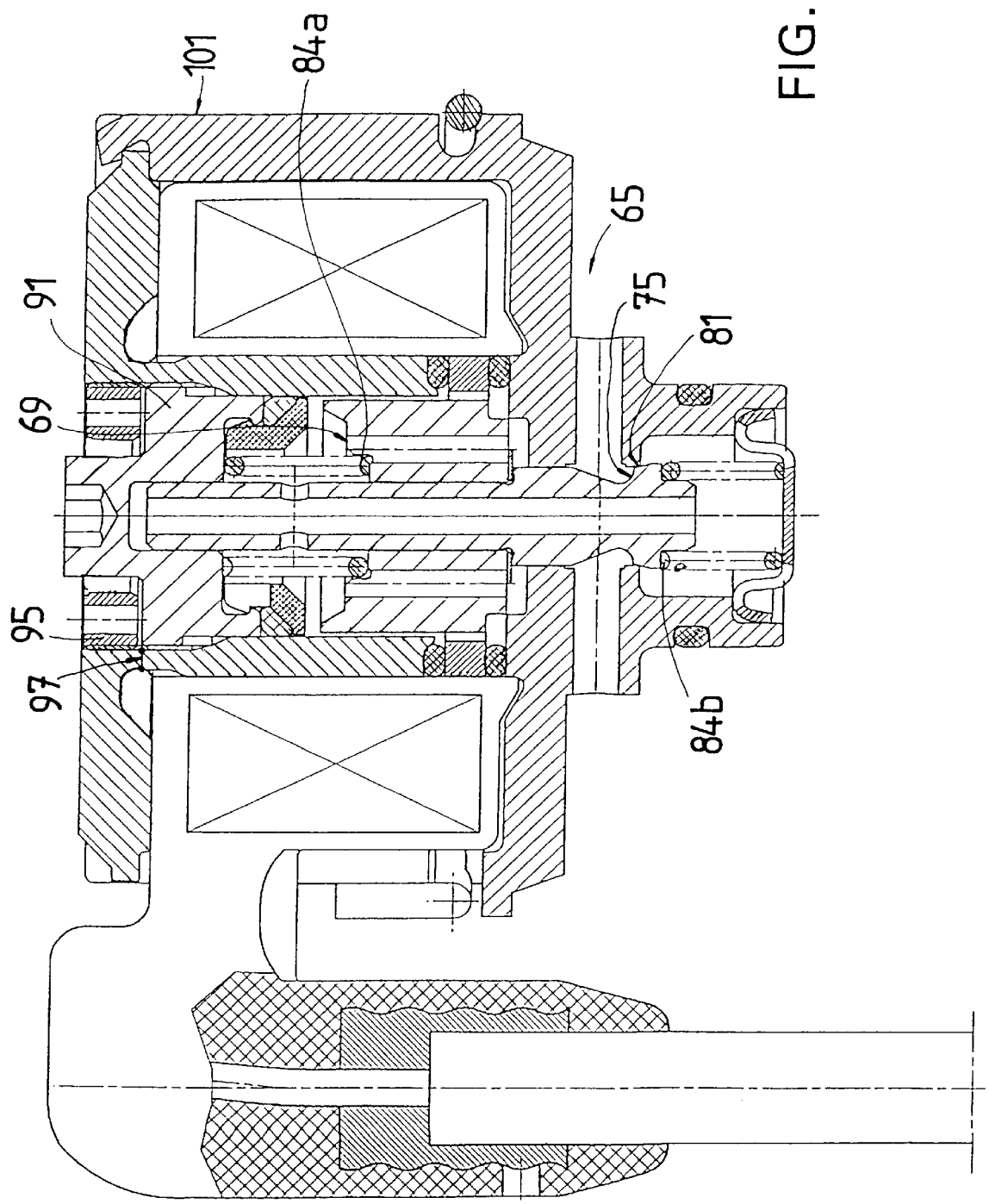
FIG. 3A shows a cross section through a pilot valve with an adjustable magnetic flux.

FIG. 3A can correspond in all essential aspects to the embodiment illustrated in FIG. 2. One difference can be the omission of an emergency operating position different from the hard damping force setting. On the damping valve shown in FIG. 3A, there is preferably only a normal operation valve part 75.

The normal operation valve part 75 can be held, so that the normal operation valve part 75 floats axially in relation to the valve seat 81, by two springs 84a, 84b, which springs 84a, 84b can be engaged in opposite directions. By means of the set screw 91, the two springs 84a, 84b can be adjusted in terms of their bias, whereby the ratio of magnetic force of the magnetic coil 67 can be changed with reference to the passage cross section defined between the valve seat 81 and the normal operation valve part 75. In this embodiment, the adjustment of the magnetic flux and the spring bias can be made from one side of the housing 101, because the conductor body 95 is preferably realized in a ring-shape and the spring support device, in this case the set screw 91, is oriented concentric to the conductor body 95.

In another possible embodiment of the present invention, the set screw 91 can be used to adjust the bias of the springs 84a, 84b. The change in the bias of the springs 84a, 84b can cause the magnetic flux produced by the magnetic coil 67 needed to reach a desired cross section between the valve seat 81 and the normal operation valve part 75 to change. Since the set screw 91 can be used to adjust the bias of the springs 84a, 84b and the set screw 91 is located near the conductor body 95, the adjustments of the damping valve can be done from one side of the housing 101.

Figure 4:
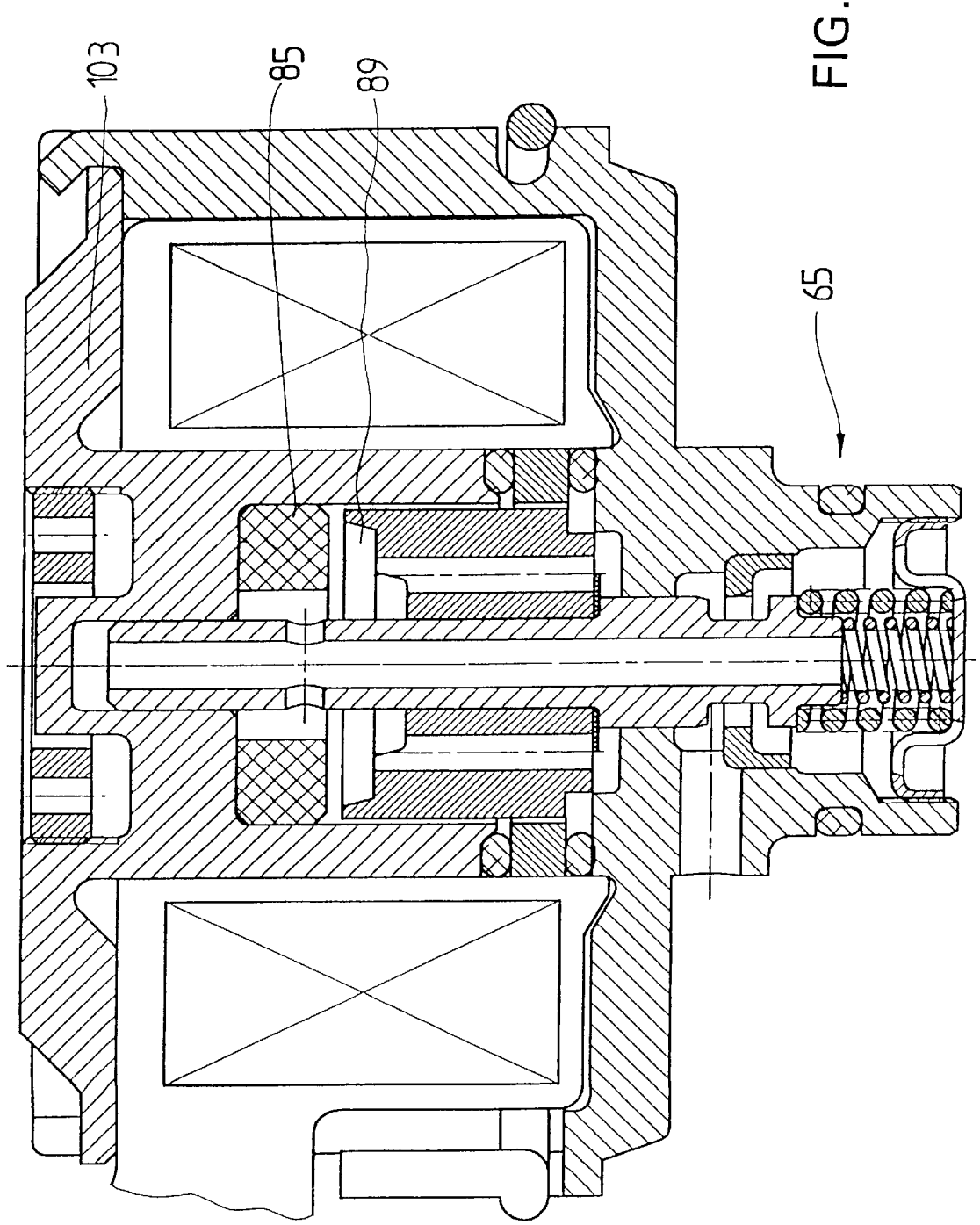
FIG. 4 shows a shutoff valve device with a stationary stop for the emergency operating position.

FIG. 4 shows an embodiment which is simplified in relation to the embodiment shown in FIG. 2. The embodiment in FIG. 4 can have a stationary stop 85 in the form of a spacer ring instead of a set screw 91. The stop 85, because it is a spacer ring, cannot be adjusted, but can very easily be modified to a specified height for a particular vehicle model. One advantage of the embodiment illustrated in FIG. 4 over the embodiment illustrated in FIG. 2 is that the cover 103 completely covers the armature reaction chamber 89. The cover 103 can also include the area which is otherwise covered by the set screw 91. Consequently, there is no need for a stop gasket 87 as in FIG. 2. The adjustment capability in terms of the normal operation of the pilot valve 65 and of the conductor body 95 is absolutely identical to the function of the embodiment illustrated in FIG. 2.

Figure 5:
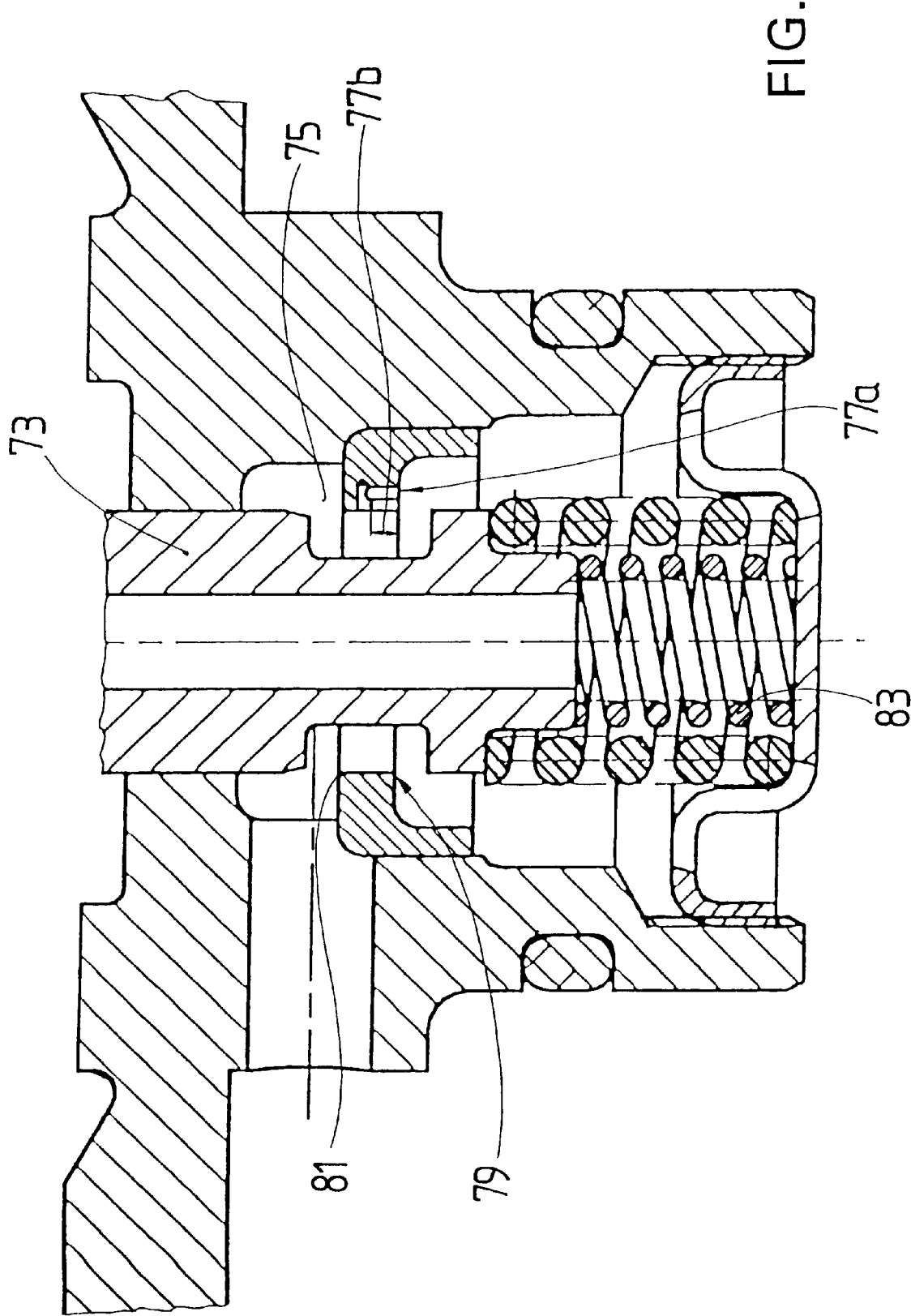
FIG. 5 shows a pilot valve with an emergency operating position which is independent of the direction.

FIG. 5 shows a detail from FIGS. 3 or 4, because the configuration of the cross section for the emergency operating position is independent of the type of stop for the armature 69 and is thus the same for the embodiments shown in FIGS. 3 and 4. The control edge 79, together with the axle or tubular body 73 of the armature 69, can represent a gate-type shutoff valve. As soon as the weaker spring of the spring set 83 has pushed the armature 69 into the emergency operating position, the armature 69 can overlap the control edge 79, as a result of which this flow path is blocked. For that purpose, there can be an emergency operating constant throttle 77a, the cross section of which emergency operating constant throttle 77a can be smaller than the cross section which is adjacent to the emergency operation constant throttle on the control edge 81 of the normal operation valve 75. The major advantage of this solution for the emergency operating action is preferably that inevitable manufacturing tolerances in the manufacture of the valve parts can be neutralized, because the overlap of the control edge 79 to the output of the emergency operation constant throttle may be available as an equalization distance 77b.

In other words and in accordance with one possible embodiment of the present invention, the spring set 83 can push the emergency operation valve part 77 into contact with the control edge 79 to preferably block the flow path between the emergency operation valve part 77 and the control edge 79. However, flow can occur through the emergency operating constant throttle 77a. The cross section of the emergency operating constant throttle 77a is preferably less than the cross section between the normal operation valve part 77 and the control edge 81.

Figure 6:
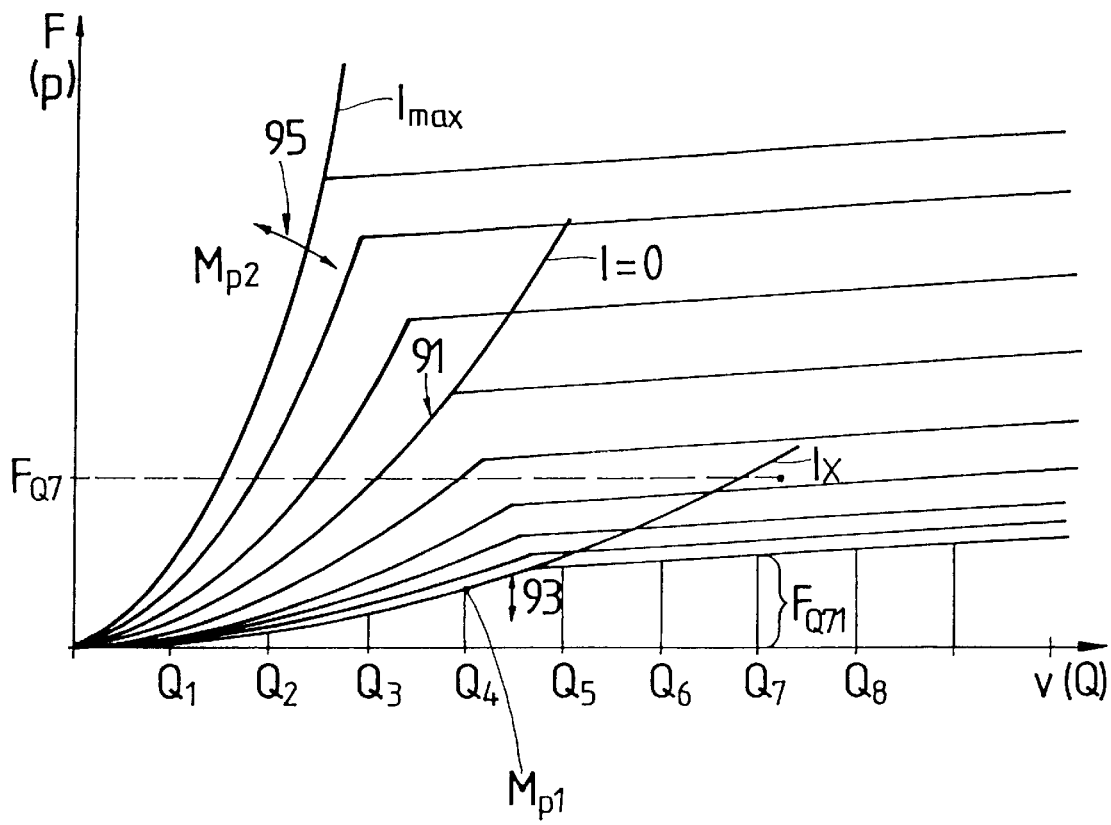
FIG. 6 shows a damping force characteristic field for the shutoff valve device.

FIG. 6 illustrates the influence of the settings on the damping force characteristics. The family of damping force characteristics illustrated in FIG. 6 can be typical for the shutoff valve device 27. The area from the origin of the family of characteristics to the salient points can be influenced or controlled by the pilot valve 65. To calibrate or adjust the pilot valve 65, first the measurement points Q/p which are significant for the desired setting are preferably specified at a small and large inflow. For example, first the measurement point $M_{p1}$ can be verified. On a hydraulic test stand, a volume flow $Q_1$ is fed to the pilot valve 65. A pressure $p_1$ of the specified measurement point $M_{p1}$ can thereby be set on a damping force characteristic.

In another possible embodiment of the present invention, the measurement point $M_{p1}$ can be verified. On a hydraulic test stand, a volume flow $Q_4$ is fed to the pilot valve 65. A pressure of the specified measurement point $M_{p1}$ can thereby be set on a damping force characteristic.

If the measurement is below or above the desired characteristic, the measurement point can be raised or lowered by the axial displacement of the spring assist plate 93 (See FIGS. 2, 3, 4 and 5) in relation to the specified Q-value, or can be displaced for a specified p-value parallel to the ordinate. All the pilot characteristics can be regulated in this manner. The hydraulic test stand makes it possible to adjust the spring assist plate 93 in the installed position on the test stand, without having to dismantle the valve. It may be that the measurement point $M_{p2}$ at $I_{max}$ shows an excessive force effect of the magnetic coil 67. The magnetic flux and thus the force applied to the armature 69 can be reduced by unscrewing the conductor body 95. The measurement point $M_{p2}$ can thereby be shifted in the direction indicated by the arrows, whereby, the shift has different effects on the different characteristics, as a function of the hydraulic flow values of the individual pilot characteristics. As a general rule, at a higher flow, the change in the pilot characteristic will preferably be more significant than with a characteristic at a smaller flow. Consequently, the conductor body 95 can be used to achieve a spreading, widening or expansion of the overall pilot characteristic range. This type of adjustment between the conductor body 95 and the spring assist plate 93 may have to be repeated, if necessary, because there may be a slight interaction between these two settings. In a combination of the two adjustment capabilities, a specified measurement point can be displaced horizontally and vertically in relation to the ordinate, whereby it is possible to come very close to the objective of a genuine adjustment of the characteristic.

In another possible embodiment of the present invention, both the conductor body 95 and the spring assist plate 93 can be used to adjust the damping force characteristics of the damping valve. By changing the position of the conductor body 95 the amount of magnetic flux passed to the ring-shaped body 71 can be controlled and in turn the damping force of the valve can be controlled. The adjustment of the spring assist plate 93 can change the bias of the spring set 83 acting upon the axle body 73 and thus change the damping force of the damping valve. Adjustments of the conductor body 95 and the spring assist plate 93 can be alternated to reach a desired damping force characteristic.

After the settings for normal operation have been completed, the emergency operation setting can be made by rotating the set screw 91. For that purpose, the stop 85 is displaced by means of the set screw 91 until a desired characteristic is achieved. This characteristic can be adjusted as desired, e.g. an intermediate characteristic can be set, or one which tends toward the hard or the soft.

The designation I=O in the characteristic should not necessarily be considered undesirable, because the characteristic I=O can naturally be achieved by the normal operation valve part 75. It should be noted that the characteristic can then be generated by various valve parts within the pilot valve part. The setting I=O has no influence on the flow characteristics.

Figure 6A:
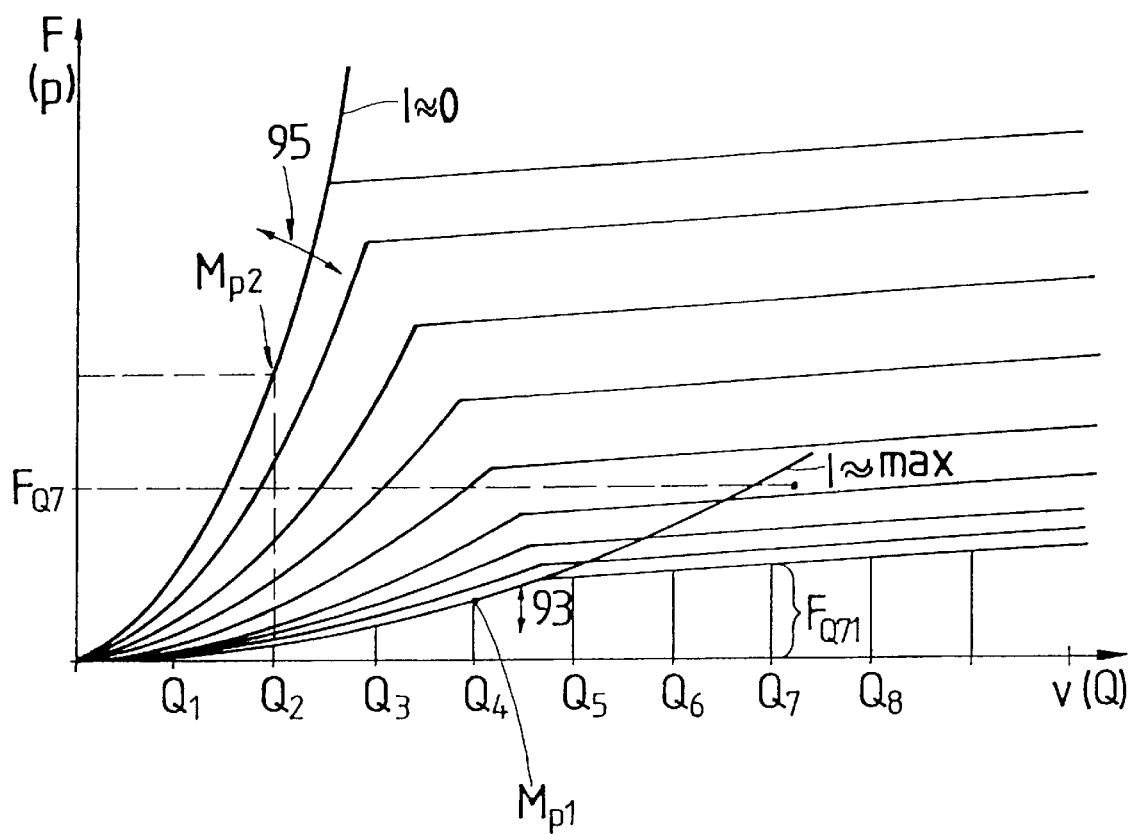
FIG. 6A shows a damping force characteristic field for a valve as illustrated in FIG. 3A.

FIG. 6A shows a damping force characteristic field for a damping valve constructed as illustrated in FIG. 3A. The regulation method is preferably the same as illustrated in FIG. 6. One difference may be the omission of the setting for the emergency operation valve part 77. As an alternative, in the event of the failure of the current, the maximum hard damping force characteristic I (equals approximately) O is used. The hydraulic test stand can be somewhat simpler than the other realizations of the damping valve, because the spring assist devices on the housing 101 are preferably accessible from outside. Furthermore, the pilot valve 65 can also be checked with the main valve 37, to test and/or adjust the entire assembly.

Figure 7:
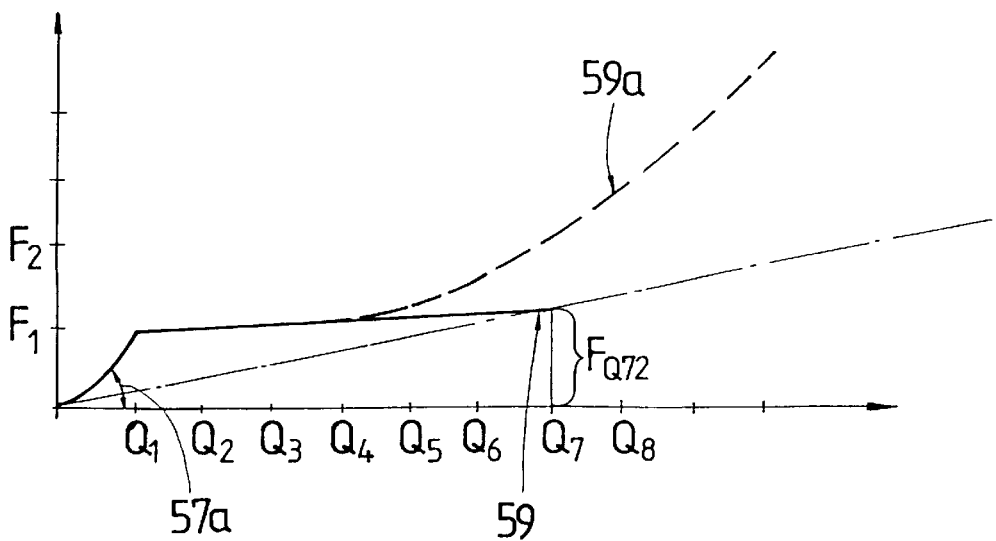
FIG. 7 shows damping force characteristics of the inlet valve.

FIG. 7 shows damping force characteristics of the inlet valve 55, which inlet valve 55 can be realized independently of the main valve 37. The damping characteristic can be kept very variable by a corresponding configuration. For example, the influence of the pilot cross section 57*a* can be significantly increased, whereby the angle of ascent can be kept flatter by a correspondingly larger opening. Adjacent to the characteristic part of the pilot cross section 57*a* can be a rather degressive branch of the characteristic. This part of the characteristic is exclusively a function of the type of bias of the at least one valve disc 59, and of the force characteristic of the at least one valve disc 59, if the at least one valve disc 59 is designed in the form of a plate spring. Of course, if necessary, it is also possible to achieve a characteristic which runs essentially linearly, if the pilot cross section 57*a* is omitted and the at least one valve disc 59 is installed practically planar or flat. The characteristic illustrated by broken lines in FIG. 7 shows the influence of the pilot disc 59*a*. The pilot disc 59*a*, at relatively high flow velocities produces a sharp increase in the damping force.

The inlet valve 55 and the main stage valve 37 are preferably connected hydraulically in series. That means it is possible to simulate or adjust the main valve 37 exactly as desired. The effect achieved by the series connection can be easily predicted. The desired characteristic field of the shutoff valve device 27 is preferably set. In this characteristic field, we plot the characteristic field of the main stage valve 37 and pilot valve 65. The damping force differences must be generated by the inlet valve 55. For example, the reverse path is presented in FIGS. 5 and 6 at a point with the volume flow $Q_7$. The volume flow $Q_7$ in FIG. 6 gives the damping force factor $F_{Q71}$. At the same volume flow, with the inlet valve 55 we get the damping force factor $F_{Q72}$ as shown in FIG. 7. The simple addition of the two individual damping force factors then gives the combined damping force amount $F_{Q7}$ as shown in FIG. 6.

In another possible embodiment of the present invention, the reverse path can be illustrated in FIGS. 6 and 7 at a point with the volume flow $Q_7$. The volume flow $Q_7$ in FIG. 6 gives the damping force factor $F_{Q71}$. At the same volume flow, with the inlet valve 55 we get the damping force factor $F_{Q72}$ as shown in FIG. 7. The simple addition of the two individual damping force factors $F_{Q71}$, $F_{Q72}$ then gives the combined damping force amount $F_{Q7}$ as shown in FIG. 6.

A The use of the inlet valve 55 may always be advantageous, in particular if the characteristic damping force characteristics of the pilot valve 65 and main valve 37 do not meet the specified requirements, i.e. as a rule, a defined damping force is not achieved. For example, the requirement can be for relatively flat main valve characteristics, but at particularly large volume flows $Q_x$ a greater damping force must be generated, e.g. to prevent wheel flutter. Frequently, a somewhat greater damping force may be desired in the characteristic range of the pilot valve 65. In this case, the damping force characteristic illustrated in FIG. 7 can be used with very good results, because it is precisely at low volume flows that it causes an increase of the damping force, but otherwise raises or increases the characteristics uniformly.

It must be recalled that the inlet valve 55 can make it possible to achieve the goal of a harder damping force characteristic without a greater flow of current to the magnetic coil 67. The steeper the characteristic of the pilot valve 65 must be, the stronger must be the current to the magnetic coil 67, because as the current flow increases, the magnetic coil 67 causes a closing movement of the pilot valve 65.

Figure 8:
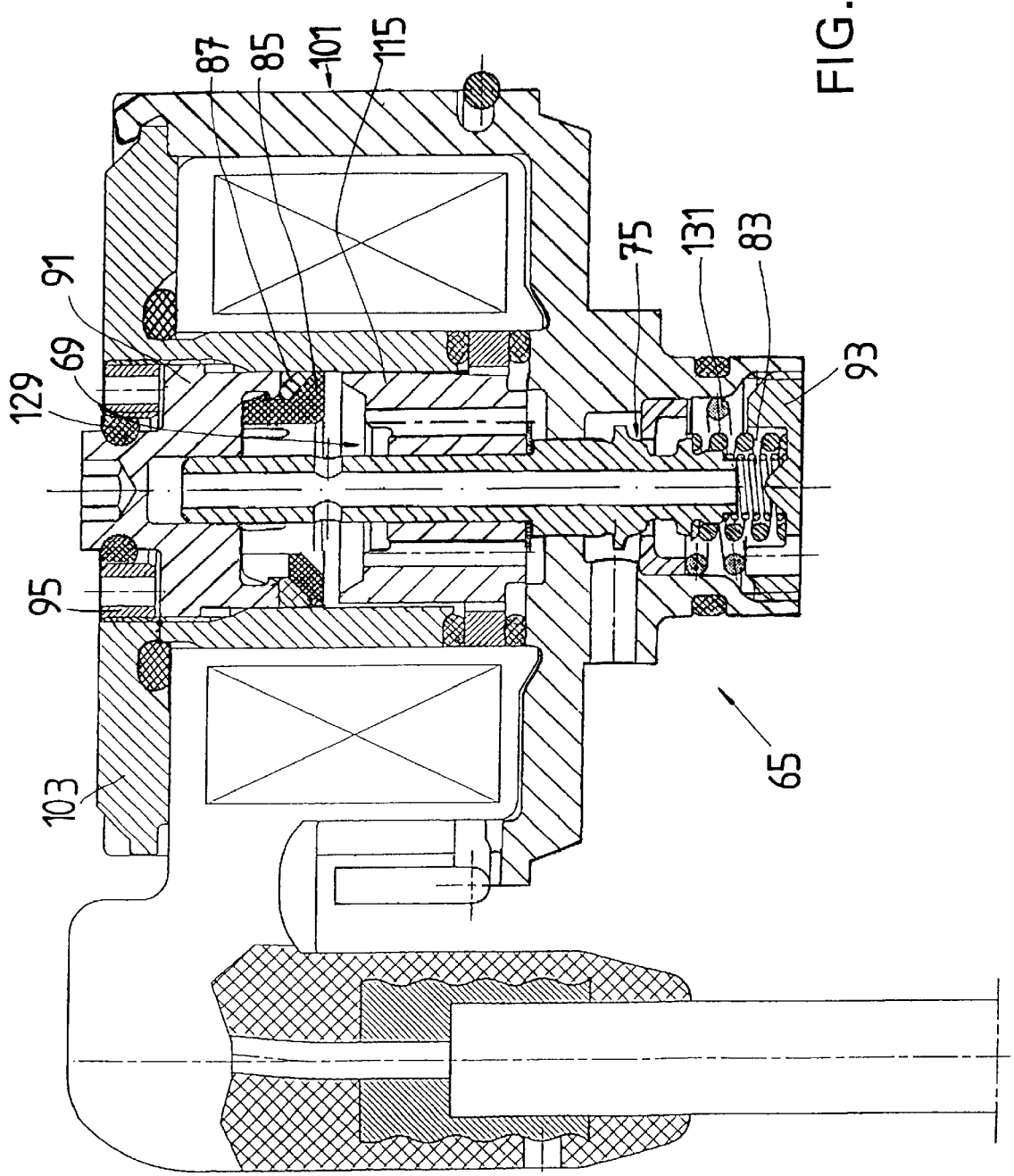
FIG. 8 shows the pilot valve with regulation retaining devices.

FIG. 8 illustrates the constructive measures which can be realized so that the damping valve, and. in particular the pilot valve 65, retain the characteristics illustrated in FIGS. 6 and 6*a* after installation.

One of the essential measures can be the stop gasket 87 behind the stop 85. The stop seal or gasket 87 can be an elastic material and can be clamped between the stop 85 and the set screw 91.

The bias force can cause a friction force between the sleeve segment 115, which sleeve segment 115 is preferably a part of the stationary housing 101, and the set screw 91. The set screw 91 can of course be rotated to make the adjustment, but there is a significant friction moment. Between the set screw 91 and the conductor body 95 there can be an adjustment retaining device 129. The adjustment retaining device can be realized in the form of a friction ring. For that purpose, at least one of the two components, in this case the set screw 91, has an indentation to hold the friction ring.

In another possible embodiment of the present invention, either the Bet screw 91 or the conductor body 95 can have an indentation to hold the adjustment retaining device 129.

The thread 95*a* between the conductor body and the cover 103 of the housing 101 can be secured to prevent unintentional detachment by threaded securing means. For the set screw 91, therefore, there are two friction forces which are applied in series, one via the adjustment retaining device 129 and another via the stop gasket 87, whereby the housing 101 or a portion of the housing 101 serves as the basis for the friction force to be supported. Of course, this type of retaining device can also be used in the embodiment illustrated in FIG. 3A.

Once there are arrangements for securing the magnetic flux setting and the stop position for emergency operation, it is also appropriate to secure the position for the normal operation valve part 75. For that purpose, the spring assist plate 93 can be provided with a regulation retaining device 131 in the form of a tension spring. The tension spring can perform two functions. On one hand, the coils of the tension spring form friction surfaces, and on the other hand the tension spring also applies the bias force, so that the overall result is a very simple and economic regulation retaining device 131.

One feature of the invention resides broadly in the vibration damper, comprising a cylinder filled with damping medium, in which a piston rod with a piston is realized so that it can move axially, whereby the piston divides the cylinder into two working chambers, with a damping valve, the damping force of which can be changed by means of a magnetic force generated by a magnetic coil inside a magnetic return body on an armature against a spring force of at least one spring, characterized by the fact that at least two regulating, setting, tuning or adjustment parameters are provided to set at least two characteristics which differ from one another in terms of different flows to the magnetic coil, in that a change of the effective spring characteristic with reference to a damping valve stroke position of the damping valve can be made, and also as a result of the ability to regulate the magnetic conductivity of the magnetic return body by means of an actuator, whereby the actuator device consists of a magnetic constriction, bottleneck or defile 97, to which a magnetic conductor body 95 can be connected in parallel.

Another feature of the invention resides broadly in the vibration damper characterized by the fact that the actuator device 95, 97 for the magnetic flux and a spring assist or support device 91, 93 can be set to change the spring force independently of one another.

Yet another feature of the invention resides broadly in the vibration damper characterized by the fact that the conductor body 95 has an essentially ring-shaped configuration, whereby there is access to the rearward portion of the armature 69.

Still another feature of the invention resides broadly in the vibration damper characterized by the fact that the spring assist device 91, 95 is oriented concentric to the actuator device for the magnetic flux.

A further feature of the invention resides broadly in the vibration damper characterized by the fact that the damping valve has one valve part 77 for an emergency operation setting and a valve part 75 for normal operation, whereby the spring force applies a bias to the valve part in the opening direction for normal operation.

Another feature of the invention resides broadly in the vibration damper characterized by the fact that the conductor body 95 is actuated by means of a thread 95a.

Yet another feature of the invention resides broadly in the vibration damper characterized by the fact that the conductor body 95 has tool surfaces 99 for an adjustment tool.

Still another feature of the invention resides broadly in the vibration damper characterized by the fact that the conductor body 95 is located outside a shutoff valve housing 101, whereby the shutoff valve housing is a component of the magnetic return body.

A further feature of the invention resides broadly in the vibration damper characterized by the fact that the conductor body 95 and an additional component 91 are located axially one behind the other in a bypass for the magnetic flux, whereby the magnetic flux is controlled by changing the distance between the conductor body and the additional component located in the bypass for the magnetic flux.

Another feature of the invention resides broadly in the vibration damper characterized by the fact that the conductor body 95 has an adjustment retaining or locking device 129.

Yet another feature of the invention resides broadly in the vibration damper characterized by the fact that the spring assist device 93 has a regulation, setting, or adjustment retaining or locking device 131.

Still another feature of the invention resides broadly in the vibration damper characterized by the fact that the regulation retaining device 131 is located between a component which is effectively connected to the housing 101 and the spring assist device 93, 91.

A further feature of the invention resides broadly in the vibration damper characterized by the fact that the regulation retaining device 131 and/or the adjustment retaining device 129 is/are non-positively actuated, actuated by adherence or actuated by gravity.

Another feature of the invention resides broadly in the vibration damper characterized by the fact that the regulation retaining device 131 and/or the adjustment retaining device 129 comprise(s) of a friction ring.

Examples of adjustable hydraulic vibration dampers with damping valves which may possibly be utilized or adapted for use in the context of the present invention may be disclosed in the following patents: U.S. Pat. No. 4,635,765, entitled "Adjustable Hydraulic Damper Apparatus"; U.S. Pat. No. 4,650,042, entitled "Hydraulic Adjustable Shock Absorber"; U.S. Pat. No. 4,723,640, entitled "Adjustable Hydraulic Vibration Damper"; U.S. Pat. No. 4,785,920, entitled "Hydraulic Adjustable Shock Absorber"; U.S. Pat. No. 4,850,460, entitled "Hydraulic Adjustable Shock Absorber"; U.S. Pat. No. 5,265,703, entitled "Adjustable Hydraulic Vibration Damper for Motor Vehicles"; U.S. Pat. No. 5,301,776, entitled "Hydraulic Adjustable Vibration Damper"; U.S. Pat. No. 5,335,757, entitled "Hydraulic Adjustable Vibration Damper"; U.S. Pat. No. 5,392,885, entitled "Adjustable Hydraulic Vibration Damper for Motor Vehicles"; U.S. Pat. No. 5,435,421, entitled "Hydraulic Adjustable Vibration Damper and a Valve System for a Hydraulic, Adjustable Vibration-Damper"; and U.S. Pat. No. 5,558,189, entitled "Adjustable Hydraulic Vibration Damper".

U.S. patent application, Ser. No. 08/879,014, filed on or about Jun. 20, 1997, and claiming priority from German Application Numbers 196 24 897.3, DE-OS 196 24 897.3 and DE-PS 196 24 897.3 filed on Jun. 21, 1996, and having Attorney Docket No. NHL-FIS-295, and having inventor Andreas Förster and having the title "A Vibration Damper and a Damp with Adjustable Damping Force for a Vibration Damper" is hereby incorporated by reference as if set forth in its entirety herein. U.S. patent application, Ser. No. 08/878,721, filed on or about Jun. 20, 1997, and claiming priority from German Application Numbers 196 24 895.7, DE-OS 196 24 895.7 and DE-PS 196 24 895.7 filed on Jun. 21, 1996, and having Attorney Docket No. NHL-FIS-296, and having inventor Andreas Förster and having the title "Vibration Damper, such as for a Motor Vehicle, with Adjustable Damping Force" is hereby incorporated by reference as if set forth in its entirety herein.

U.S. patent application, Ser. No. 08/879,158, filed on or about Jun. 20, 1997, and claiming priority from German Application Numbers 196 24 898.1, DE-OS 196 24 898.1 and DE-PS 196 24 898.1 filed on Jun. 21, 1996, and having Attorney Docket No. NHL-FIS-300, and having inventor Andreas Förster and having the title "A Vibration Damper and a Vibration Damper with a Damping Valve having an Adjustable Damping Force" is hereby incorporated by reference as if set forth in its entirety herein.

The components disclosed-in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 196 24 896.5, filed on Jun. 21, 1996, and having Inner Priority 197 22 216.1, filed on May 28, 1997, having inventor Andreas Förster, and DE-OS 196 24 896.5 and DE-PS 196 24 896.5 and International Application No. 197 22 216.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper having an adjustable damping force characteristic for a motor vehicle, said vibration damper comprising:
    a cylinder;
    said cylinder being configured to contain a damping medium;
    said cylinder comprising a first end and a second end disposed opposite to said first end of said cylinder;
    said first end of said cylinder being configured to operatively connect to a first part of a motor vehicle;
    a piston rod;
    said piston rod sealingly projecting into said second end of said cylinder;
    said piston rod comprising a first end and a second end;
    said second end of said piston rod being disposed opposite to said first end of said piston rod;
    said first end of said piston rod being configured to operatively connect to a second part of a motor vehicle;
    a piston;
    said piston being disposed on said second end of said piston rod;
    said piston being configured and disposed to slide within said cylinder;
    said piston being configured and disposed to divide said cylinder into a first chamber and a second chamber;
    a damping valve;
    said damping valve being configured and disposed to control flow of damping medium from at least one of said first chamber and said second chamber to adjust the damping force characteristic of said vibration damper;
    said damping valve having a longitudinal axis; and
    said damping valve comprising:
        a magnetic coil;
        said magnetic coil being configured to generate magnetic flux upon application of electrical current to said magnetic coil;
        a magnetic path to permit guidance of magnetic flux generated by said magnetic coil in said damping valve;
        said magnetic path comprising an armature structure;
        a portion of said armature structure being configured and disposed to control flow of damping medium through said damping valve to adjust the damping force characteristic of said vibration damper;
        said armature structure being configured and disposed to be displaced in a first axial direction by magnetic flux generated by said magnetic coil to control the flow of damping medium through said damping valve;
        a spring arrangement;
        said spring arrangement being disposed to bias said armature structure in a direction opposite to the first axial direction to control the flow of damping medium through said damping valve;
        said spring arrangement being configured to vary the bias applied to said armature structure by said spring arrangement;
        said magnetic path comprising an arrangement to adjust the guidance of magnetic flux through said magnetic path to said armature structure to adjust a force in said armature structure produced by said magnetic flux;
        said arrangement to adjust the guidance of magnetic flux comprising a first member and a second member;
        said first member being configured to restrict guidance of magnetic flux through said magnetic path;
        said second member being configured to permit guidance of magnetic flux around said first member; and
        said second member being connected substantially parallel to said first member.

2. The vibration damper according to claim 1, wherein:
    said adjusting arrangement is configured and disposed to be positioned independently of said spring arrangement to adjust the guidance of magnetic flux through said magnetic path to said armature structure; and
    said spring arrangement is configured and disposed to be positioned independently of said adjusting arrangement to adjust the bias applied to said armature structure by said spring arrangement.

3. The vibration damper according to claim 2, wherein:

said second member of said adjusting arrangement is substantially ring-shaped;

said armature structure comprises a first end and a second end;

said first end of said armature structure is disposed adjacent to said second member;

said second end of said armature structure is disposed opposite to said first end of said armature structure; and said second member is configured to permit access to said first end of said armature structure.

4. The vibration damper according to claim 3, wherein:

said second member of said adjusting arrangement comprises a first surface;

said first surface of said second member is disposed adjacent to an exterior surface of said damping valve; and said first surface of said second member is configured to receive an adjustment tool to displace said second member along the longitudinal axis.

5. The vibration damper according to claim 4, wherein:

said first member of said adjusting arrangement comprises a threaded portion;

said second member of said adjusting arrangement comprises a threaded portion; and said threaded portion of said second member is configured to mesh with said threaded portion of said first member to permit adjustment of said second member with respect to said first member.

6. The vibration damper according to claim 5, wherein:

said damping valve comprises a housing to enclose at least a portion of said damping valve;

said magnetic path comprises at least a portion of said housing; and at least a portion of said second member of said adjusting arrangement is disposed outside of said housing.

7. The vibration damper according to claim 6, wherein:

said adjusting arrangement comprises an additional magnetic path for magnetic flux generated by said magnetic coil;

said additional magnetic path comprises said second member and a third member;

said third member is disposed substantially parallel to said first member;

said third member is disposed along the longitudinal axis between said second member and said first end of said armature structure;

said third member is disposed an axial distance from said second member; and said additional magnetic path is configured to adjust the guidance of magnetic flux through said magnetic path by changing the axial distance between said second member and said third member.

8. The vibration damper according to claim 7, wherein said adjusting arrangement comprises a first device to hold said second member in a fixed position.

9. The vibration damper according to claim 8, wherein:

said spring arrangement comprises a spring assist device; and said spring assist device As disposed concentric to said adjusting arrangement.

10. The vibration damper according to claim 9, wherein:

said spring arrangement comprises at least one spring to bias said armature structure;

said spring assist device is configured and disposed to support said at least one spring;

said spring assist device is displaceable along the longitudinal axis; and said spring assist device comprises one of a spring plate and said third member of said adjusting arrangement.

11. The vibration damper according to claim 10, wherein:

said spring assist device comprises said spring plate;

said spring plate is disposed adjacent to said second end of said armature structure; and said spring arrangement comprises a second device to hold said spring plate in a fixed position.

12. The vibration damper according to claim 11, wherein:

said housing is configured to substantially enclose said magnetic coil, said armature structure and said spring arrangement; and said second device is disposed between said housing and said spring plate to fix said spring plate in a position to set the bias applied to said armature structure by said spring arrangement.

13. The vibration damper according to claim 12, wherein at least one of said first device and said second device are force-locking with said damping valve.

14. The vibration damper according to claim 13, wherein:

said first device comprises a first friction ring; and said first friction ring is frictionally held in a groove in one of said second member of said adjusting arrangement and said third member of said adjusting arrangement.

15. The vibration damper according to claim 14, wherein:

said second device is configured and disposed to be in frictional contact with said housing to hold said spring plate in a fixed position; and said second device comprises one of a second friction ring and a tension spring.

16. The vibration damper according to claim 15, wherein:

said second end of said armature structure comprises a first valve part and a second valve part;

said magnetic coil has an energized state in response to electrical current being applied to said magnetic coil;

said first valve part is configured and disposed to regulate flow of damping medium through said damping valve in response to said magnetic coil being energized; and said second valve part is configured and disposed to regulate flow of damping medium through said damping valve in response to said magnetic coil being de-energized.

17. The vibration damper according to claim 16, wherein:

said damping valve comprises a stop member;

said stop member is configured and disposed to stop displacement of said armature structure by said spring arrangement upon said magnetic coil being de-energized;

said stop member is displaceable along said longitudinal axis;

said third member is configured and disposed to displace said stop member;

said damping valve comprises a stop gasket;

said stop gasket is configured to limit axial displacement of said stop member; and said stop gasket is disposed between said third member and said stop member.

18. The vibration damper according to claim 17, wherein:

said magnetic path comprises a first segment;

said first segment is disposed adjacent to both said first member of said adjusting arrangement and said armature structure;

said first segment is disposed substantially parallel to the longitudinal axis;

said damping valve comprises an insulator arrangement;

said insulator arrangement is configured and disposed to guide magnetic flux from said first segment through said armature structure to said housing;

said insulator arrangement is configured and disposed to limit guidance of magnetic flux between said first segment and said housing;

said magnetic path comprises a second segment;

said second segment is configured and disposed to guide magnetic flux from said magnetic coil to said adjusting arrangement;

said armature structure comprises a shaft member;

said shaft member is disposed along the longitudinal axis;

said armature structure comprises a body;

said body of said armature structure is connected to said shaft member;

said body of said armature structure is configured to receive magnetic flux from said first segment to permit axial displacement of said armature structure by magnetic flux;

said first valve part and said second valve part are disposed on said shaft member;

said first valve part is disposed a substantial axial distance from said second valve part;

said damping valve comprises a passageway for permitting flow of damping medium through said damping valve;

said damping valve comprises a third valve part;

said third valve part is disposed between said first valve part and said second valve part;

said third valve part comprises a first surface and a second surface;

said first surface of said third valve part is disposed adjacent to said first valve part;

said first surface of said third valve part and said first valve part are configured and disposed to together form a first portion of said passageway;

said second surface of said third valve part is disposed adjacent to said second valve part;

said second surface of said third valve part and said second valve part are configured and disposed to together form a second portion of said passageway;

said first portion of said passageway has a cross section;

said second portion of said passageway has a cross section;

at least one of said cross section of said first portion of said passageway and said second portion of said passageway controls at least a portion of the damping force characteristic of said vibration damper; and said at least one spring is configured to bias said armature structure in a direction opposite to the first axial direction to increase the cross section of said first portion of said passageway.

19. The vibration damper according to claim 18, wherein:

said vibration damper comprises a main valve;

said main valve is connected to said damping valve;

said main valve is configured to permit passage of damping medium from said main valve into said damping valve;

said second end of said cylinder comprises a guiding element;

said guiding element is configured to guide said piston rod into said cylinder;

said first chamber is disposed adjacent to said first end of said cylinder;

said second chamber is disposed adjacent to said second end of said cylinder;

said piston comprises a first valve apparatus;

said first valve apparatus is configured and disposed to permit flow of hydraulic damping fluid between said first chamber and said second chamber;

said vibration damper comprises a third chamber;

said third chamber is disposed about said cylinder;

said second end of said cylinder comprises an opening;

said opening is configured and disposed to permit flow of hydraulic damping medium between said second chamber and said third chamber;

said vibration damper comprises a fourth chamber;

said fourth chamber is disposed about said third chamber;

said fourth chamber is configured and disposed to receive damping medium from said passageway of said damping valve;

said first end of said cylinder comprises a base plate;

said base plate comprises a second valve apparatus;

said second valve apparatus is configured and disposed to permit flow of damping medium between said first chamber and said fourth chamber;

said vibration damper comprises an inlet valve;

said-inlet valve is connected to said main valve; and said inlet valve is configured to permit passage of damping medium from said third chamber to said main valve.

20. A vibration damper having an adjustable damping force characteristic for a motor vehicle, said vibration damper comprising:

a cylinder;

said cylinder being configured to contain a damping medium;

said cylinder comprising a first end and a second end disposed opposite to said first end of said cylinder;

said first end of said cylinder being configured to operatively connect to a first part of a motor vehicle;

a piston rod;

said piston rod sealingly projecting into said second end of said cylinder;

said piston rod comprising a first end and a second end;

said second end of said piston rod being disposed opposite to said first end of said piston rod;

said first end of said piston rod being configured to operatively connect to a second part of a motor vehicle;

a piston;

said piston being disposed on said second end of said piston rod;

said piston being configured and disposed to slide within said cylinder;

said piston being configured and disposed to divide said cylinder into a first chamber and a second chamber;

a damping valve;

said damping valve being configured and disposed to control flow of damping medium from at least one of said first chamber and said second chamber to adjust the damping force characteristic of said vibration damper;

said damping valve having a longitudinal axis; and said damping valve comprising:

a magnetic coil;

said magnetic coil being configured to generate magnetic flux upon application of electrical current to said magnetic coil;

a magnetic path to permit guidance of magnetic flux generated by said magnetic coil in said damping valve;

said magnetic path comprising an armature structure;

a portion of said armature structure being configured and disposed to control flow of damping medium through said damping valve to adjust the damping force characteristic of said vibration damper;

said armature structure being configured and disposed to be displaced in a first axial direction by magnetic flux generated by said magnetic coil to control the flow of damping medium through said damping valve;

a spring arrangement;

said spring arrangement being disposed to bias said armature structure in a direction opposite to the first axial direction to control the flow of damping medium through said damping valve;

said spring arrangement being configured to vary the bias applied to said armature structure by said spring arrangement; and said magnetic path comprising an arrangement to adjust the guidance of magnetic flux through said magnetic path to said armature structure to adjust a force in said armature structure produced by said magnetic flux.

\* \* \* \* \*